Patented Oct. 19, 1943

2,332,180

UNITED STATES PATENT OFFICE

2,332,180

PROCESS OF MAKING ALKALI METAL CHLORITES

Edward Cornelius Soule, Niagara Falls, N. Y., assignor to The Mathieson Alkali Works, Inc., New York, N. Y., a corporation of Virginia No Drawing. Application June 13, 1941, Serial No. 397,868

2 Claims. (Cl. 23—85)

My invention relates to the production of alkali metal chlorites from chlorine dioxide.

Chlorine dioxide can be reduced, quantitatively, with peroxides of the alkaline earth metals to form the corresponding alkaline earth metal chlorite. Chlorine dioxide can also be reduced with alkali metal peroxides, but this reaction is less efficient than that with the alkaline earth metal peroxides. It has also been proposed to reduce chlorine dioxide with hydrogen peroxide in the presence of caustic alkalies with formation of the alkali metal chlorite, but this reaction is accompanied by losses, prohibitive in the practical sense, of hydrogen peroxide. Refrigeration of the reaction mixture will reduce these losses, but not enough to permit practical application of the reaction. Such attempts to reduce chlorine dioxed with hydrogen peroxide have fallen far short of the efficiency, measured by consumption of hydrogen peroxide, of the theoretical equation as follows:

$$2ClO_2 + 2NaOH + H_2O_2 \rightarrow 2NaClO_2 + O_2 + 2H_2O$$

I have now discovered that this reduction of chlorine dioxide to produce alkali metal chlorites can be carried on with substantially quantitative consumption of hydrogen peroxide and substantially quantitative conversion to alkali metal chlorite, according to the following type equation, if the alkali metal is supplied to the reaction as alkali metal bicarbonate:

$$2ClO_2 + 2NaHCO_3 + H_2O_2 \rightarrow 2NaClO_2 + 2CO_2 + O_2 + 2H_2O$$

Thus, the improvement of my invention consists essentially in absorbing chlorine dioxide in an aqueous solution containing hydrogen peroxide and the alkali metal bicarbonate. High chemical efficiency, both with respect to consumption of hydrogen peroxide and with respect to conversion of chlorine dioxide, can thus be attained. The alkali metal bicarbonates, moreover, afford a low cost source of alkali metal. Further, my improved process can be carried out with reaction mixtures of high concentration eliminating any necessity for concentration, for example by evaporation of water, entailing possibilities of chlorite losses. Substantially pure alkali metal chlorites can be directly produced in this manner.

Advantageous embodiments of the process of my invention are illustrated by the following specific examples:

I

Sodium bicarbonate, 0.0503 mole of chemically pure $NaHCO_3$, is dissolved in hydrogen peroxide, 0.0251 mole of $H_2O_2$ as commercial 100 volume hydrogen peroxide, 27.43% $H_2O_2$ (by weight), and sufficient water to complete solution of the sodium bicarbonate, 2.23 moles of $H_2O$. This solution is stable at temperatures of 23°–24° C. Chlorine dioxide diluted with air to a safe handling concentration, for example to maintain a partial pressure of chlorine dioxide not exceeding about 100 mm. of mercury, is introduced into this solution until chlorine dioxide appears in the effluent gases while maintaining a temperature of about 25° C. The chlorine dioxide is absorbed by the solution and the evolved carbon dioxide and oxygen are carried off with the diluting air. Excess chlorine dioxide is then stripped from the solution by aeration. The solution should then be free from chlorate, chloride and hydrogen peroxide. In one such operation I recovered 0.0501 mole of sodium chlorite, substantially 100% of the theoretical recovery, in the solution thus formed.

II

A slurry is prepared from 0.201 mole of chemically pure $NaHCO_3$, 0.1004 mole of $H_2O_2$ as the same commercial 100 volume hydrogen peroxide, and 3.34 moles of $H_2O$. Chlorine dioxide diluted with air is introduced into this slurry until chlorine dioxide appears in the effluent gases while maintaining a temperature of about 24°–26° C. Excess chlorine dioxide is then stripped from the resulting solution by aeration. A clear concentrated solution of aqueous sodium chlorite is produced. This solution should be free from chlorate and chloride. In one such operation I recovered 0.1977 mole of sodium chlorite, 98.9% of the theoretical recovery, in the resulting solution.

III

Potassium bicarbonate, 0.1005 mole of chemically pure $KHCO_3$, is dissolved in hydrogen peroxide, 0.0502 mole of $H_2O_2$ as the same commercial 100 volume product, and additional water to complete solution of the potassium bicarbonate, 0.28 mole of $H_2O$. Chlorine dioxide diluted with air is introduced into this solution until chlorine dioxide appears in the effluent gases while maintaining a temperature of about 25° C. Excess chlorine dioxide is then stripped from the solution by aeration. Upon standing, crystalline potassium chlorite precipitates from the concentrated solution thus produced without evaporation. The product should be free from chlorate and chloride and the solution should be free from hydrogen peroxide. In one such operation I recovered 0.0990 mole of potassium chlorite, 99% of the theoretical recovery.

IV

Sodium bicarbonate, 0.0503 mole of chemically pure NaHCO₃, is dissolved in hydrogen peroxide, 0.0251 mole of the same commercial 100 volume product, and sufficient water to complete solution, from 0.28 to 0.35 mole of $H_2O$. Chlorine dioxide diluted with air is introduced into this solution until chlorine dioxide appears in the effluent gases while maintaining a temperature of 32°–36° C. Excess chlorine dioxide is then stripped from the solution by aeration. In one such operation I recovered 0.0485 mole of sodium chlorite, 97.1% of the theoretical recovery, in the solution thus produced.

My invention provides for direct production of concentrated solutions, free from impurities, of the alkali metal chlorites. Thus, solutions from which the chlorite can be separated as a solid without concentration by evaporation can be produced, or concentrated solutions produced in this manner may be dried, in appropriate apparatus, for the production of solid chlorite of high purity. Refrigeration is not required to prevent losses of hydrogen peroxide. The reaction can be carried on at temperatures as high as 40° C. or at even higher temperatures. In the higher range of temperatures, it is advantageous to limit the amount of hydrogen peroxide in the reaction mixture at any one time to that just sufficient to maintain the presence of hydrogen peroxide against the consumption involved. The absorption of chlorine dioxide is substantially complete as long as some free hydrogen peroxide is present in the alkali metal bicarbonate solution. The products of the reaction, other than sodium chlorite and water, are carbon dioxide and oxygen which pass through the reaction mixture with the diluting air without contamination of the solution. This carbon dioxide and oxygen may be recovered in the production of alkali metal bicarbonates and hydrogen peroxide in a cyclic manner.

I claim:

1. In the production of alkali metal chlorites, the improvement which comprises absorbing chlorine dioxide in an aqueous solution containing hydrogen peroxide and an alkali metal bicarbonate.

2. In the production of alkali metal chlorites, the improvement which comprises absorbing chlorine dioxide in an aqueous solution of hydrogen peroxide and an alkali metal bicarbonate wherein the initial molar ratio of hydrogen peroxide to alkali metal bicarbonate is substantially 1:2.

EDWARD CORNELIUS SOULE.